US009883067B2

(12) United States Patent
Kozuka

(10) Patent No.: US 9,883,067 B2
(45) Date of Patent: Jan. 30, 2018

(54) MEMORY RESET CONTROL APPARATUS, METHOD FOR CONTROLLING THE CONTROL APPARATUS, AND STORAGE MEDIUM

(71) Applicant: CANON KABUSHIKI KAISHA, Tokyo (JP)

(72) Inventor: Yasuhiro Kozuka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/614,275

(22) Filed: Feb. 4, 2015

(65) Prior Publication Data

US 2015/0229797 A1 Aug. 13, 2015

(30) Foreign Application Priority Data

Feb. 7, 2014 (JP) ................................. 2014-022028

(51) Int. Cl.
| | | |
|---|---|---|
| *H04N 1/00* | (2006.01) | |
| *G06F 1/26* | (2006.01) | |
| *G06K 15/00* | (2006.01) | |

(52) U.S. Cl.
CPC ........... *H04N 1/00893* (2013.01); *G06F 1/26* (2013.01); *H04N 1/00899* (2013.01); *H04N 1/00901* (2013.01); *H04N 1/00904* (2013.01); *G06K 15/4055* (2013.01)

(58) Field of Classification Search
CPC ................................................. H04N 1/00893
USPC ......................................... 358/1.14; 713/300
See application file for complete search history.

(56) References Cited

U.S. PATENT DOCUMENTS

| | | | | |
|---|---|---|---|---|
| 5,204,964 A * | 4/1993 | Bowden, III | ....... | G06F 11/1441 365/228 |
| 6,084,813 A * | 7/2000 | Kikuchi | ................ | G11C 11/406 365/222 |
| 2003/0072139 A1* | 4/2003 | Yamaguchi | .......... | H05K 7/1407 361/759 |
| 2004/0155918 A1* | 8/2004 | Shimamura | .......... | B41J 2/16517 347/19 |
| 2007/0280720 A1* | 12/2007 | Kimura | .................. | G03G 15/80 399/88 |
| 2012/0320402 A1* | 12/2012 | Okuzono | ........... | G03G 15/5004 358/1.14 |

(Continued)

FOREIGN PATENT DOCUMENTS

JP 08-205424 A 8/1996

*Primary Examiner* — Jacky X Zheng
(74) *Attorney, Agent, or Firm* — Canon U.S.A., Inc. IP Division

(57) ABSTRACT

A control apparatus includes a first control unit, a second control unit including a memory for storing information for performing startup processing, and a power supply unit configured to supply electric power to the first control unit and the second control unit, and in a case where electric power is supplied from the power supply unit to the second control unit, whether a startup state of the second control unit is normal is determined. In a case where the startup state of the second control unit is determined to be normal, the power supply unit supplies electric power to the first control unit. In a case where the startup state of the second control unit is determined to be not normal, to power supply to the memory from a backup power supply for the memory is stopped so as to clear the memory of the second control unit.

20 Claims, 12 Drawing Sheets

(56) References Cited

U.S. PATENT DOCUMENTS

2014/0047249 A1* 2/2014 Koga .................... G06F 1/3206
713/310

* cited by examiner

FIG. 5

|  | OPERATION | SLEEP | SOFT OFF |
|---|---|---|---|
| CPU POWER SUPPLY STATE SIGNAL 1 | H | H | L |
| CPU POWER SUPPLY STATE SIGNAL 2 | H | L | L |

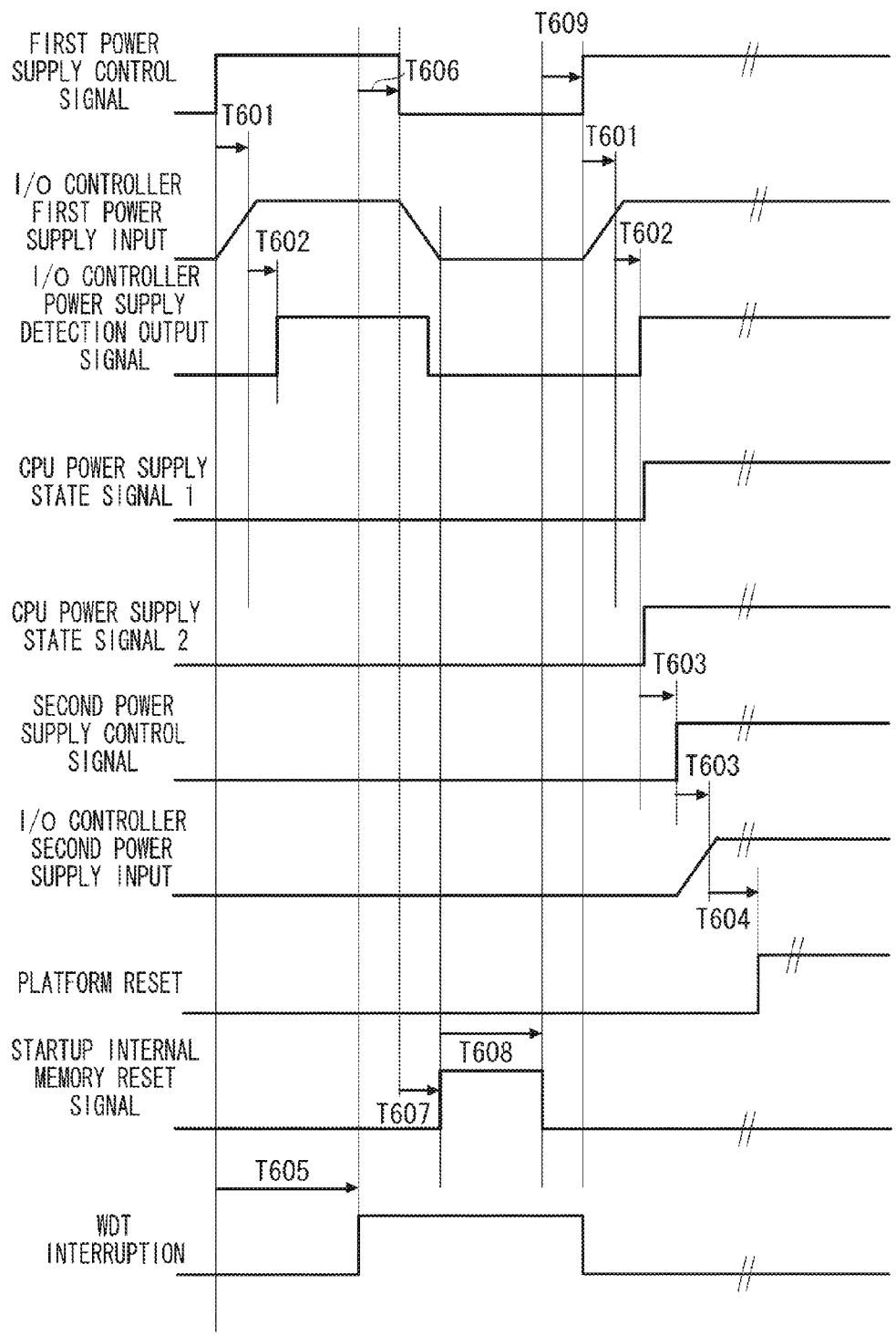

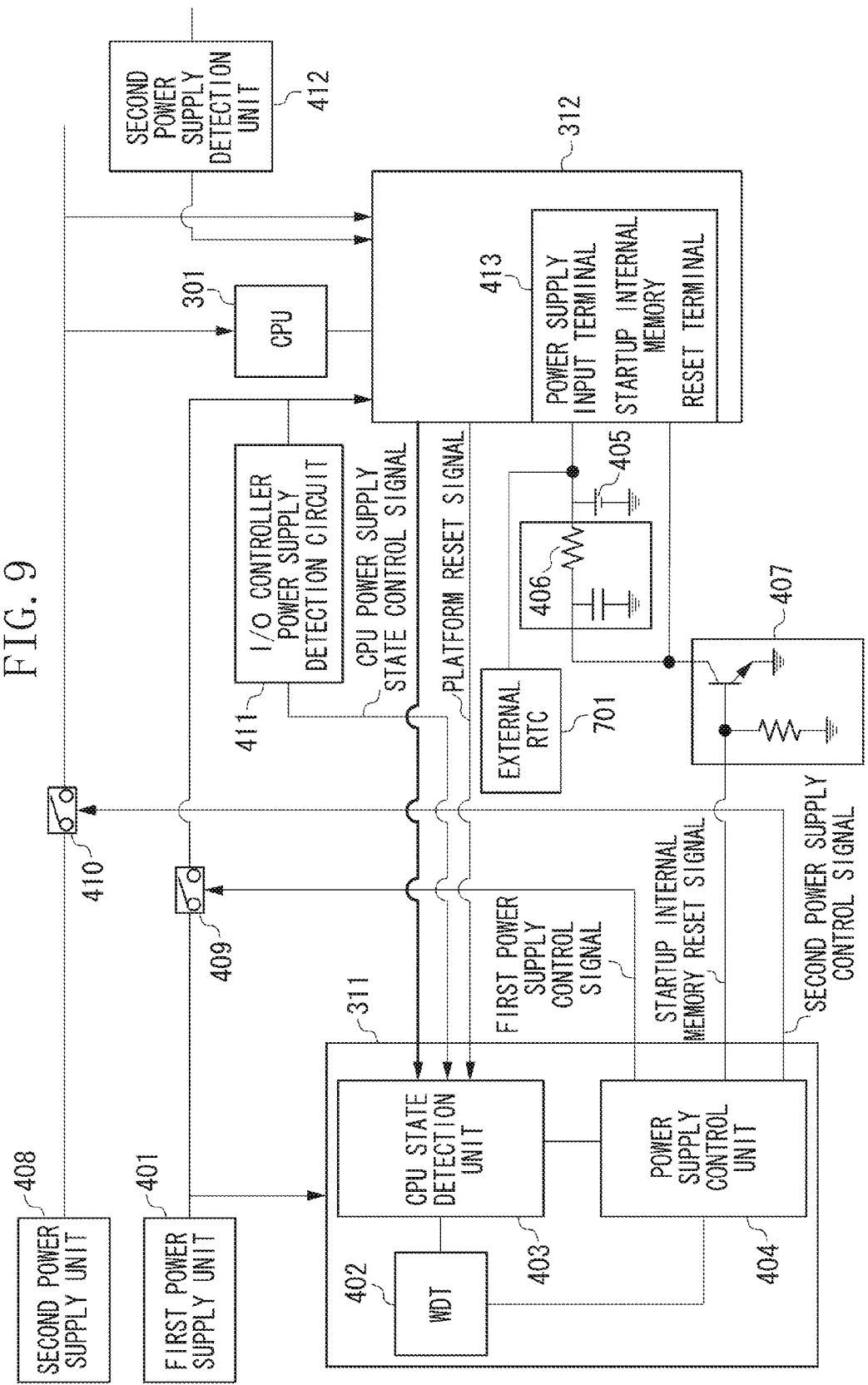

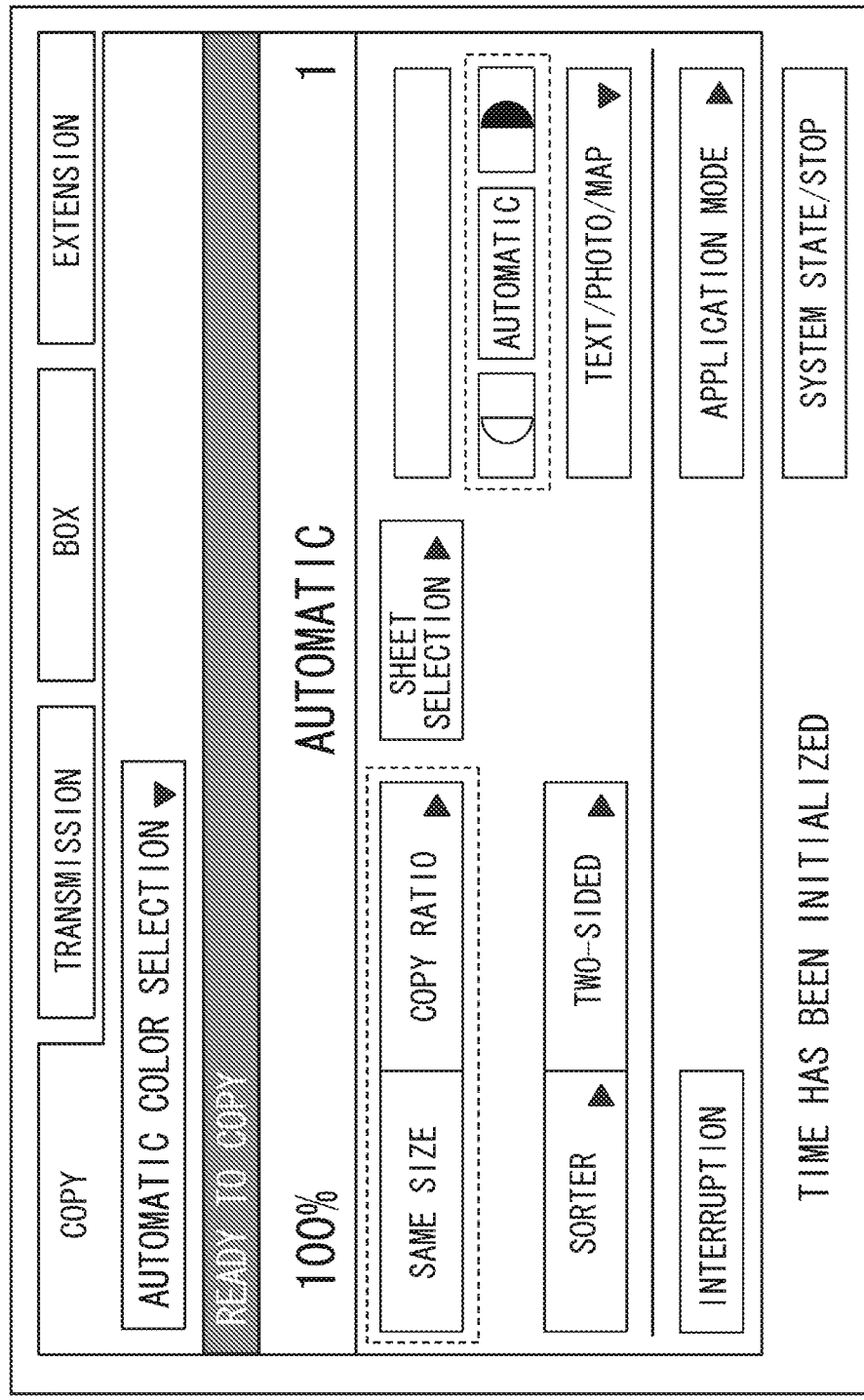

US 9,883,067 B2

MEMORY RESET CONTROL APPARATUS, METHOD FOR CONTROLLING THE CONTROL APPARATUS, AND STORAGE MEDIUM

BACKGROUND OF THE INVENTION

Field of the Invention

The present invention relates to a control apparatus, a method for controlling the control apparatus, and a storage medium.

Description of the Related Art

Conventionally, in a computer system and the like, a memory unit for storing time, hardware setting information, for example a top address setting used when a central processing unit (CPU) 301 reads information in an external read-only memory (ROM) at starting, and power supply state designation at starting, is provided. Backup of such a content of the memory unit is normally performed using a coin battery (button battery), or the like.

The power supply state includes an operation state in which all power supply for a control apparatus is energized and a sleep state in which the control apparatus is set to respond to an external operation while components other than the control apparatus are set to sleep and thereby a power saving state can be realized. The power supply state also includes a soft off state in which whether to supply electric power is determined by checking a state of an electrical signal even after hardware power supply is turned on. The memory unit is hereinafter referred to as "startup internal memory". At the time of power-on, processing for starting the system according to hardware setting information in the startup internal memory unit is performed.

Consequently, if the information in this area is rewritten due to some reasons including external factors, the system may not correctly start.

To avoid such a problem, in a state where all peripheral power supply is once turned off, a reset signal supplied to the startup internal memory unit is forcibly asserted. Therefore, a user causes a jumper pin mounted on a motherboard to be short-circuited for initializing a startup internal memory portion. Alternatively, Japanese Patent Application Laid-Open No. 8-205424 discusses a method in which a battery power supply is discharged once for initialization.

However, in the method discussed in Japanese Patent Application Laid-Open No. 8-205424, voltage reduction in the startup internal memory unit is detected, and an electric charge is once extracted. Therefore, such a method cannot be applied to a case where the battery power supply is normal. Moreover, normally, the startup internal memory unit is provided in a multi-power supply integrated circuit (IC), and complies with a power supply sequence specified by the IC. Consequently, it is necessary to turn on the peripheral power supply after startup internal memory initialization is performed in a state where power supply for other than the startup internal memory unit are turned off.

There is also an issue that for example, if a top address setting used in reading information in an external ROM or a portion for specifying a power supply state at starting especially in the startup internal memory unit are in an abnormal state, the apparatus may not start.

SUMMARY OF THE INVENTION

The present invention is for addressing the above-described issues. The present invention is directed to a technique for normally starting a controller by resetting a memory in response to detecting that a content of the memory for performing power supply start processing is not in a normal state.

According to an aspect of the present invention, a control apparatus includes a first control unit, a second control unit including a memory for storing information for performing startup processing, a power supply unit configured to supply electric power to the first control unit and the second control unit, a determination unit configured to determine, in a case where electric power is supplied from the power supply unit to the second control unit, whether a startup state of the second control unit is normal, and a power supply control unit configured to stop, in a case where the determination unit determines that the startup state of the second control unit is not normal, power supply to the memory from a backup power supply for the memory so as to clear the memory of the second control unit.

Further features of the present invention will become apparent from the following description of exemplary embodiments with reference to the attached drawings.

BRIEF DESCRIPTION OF THE DRAWINGS

FIG. 5 is a table illustrating a power supply state of the control apparatus.

FIGS. 7A, 7B, and 7C are timing charts each illustrating a power supply start state of the control apparatus illustrated in FIG. 4.

FIG. 9 is a block diagram illustrating a configuration for power supply control of the control apparatus.

FIG. 10 illustrates an example of a user interface (UI) screen displayed on an operation unit.

DESCRIPTION OF THE EMBODIMENTS

Exemplary embodiments of the present invention will be described with reference to the attached drawings.

<Description of System Configuration>

Figure 1:
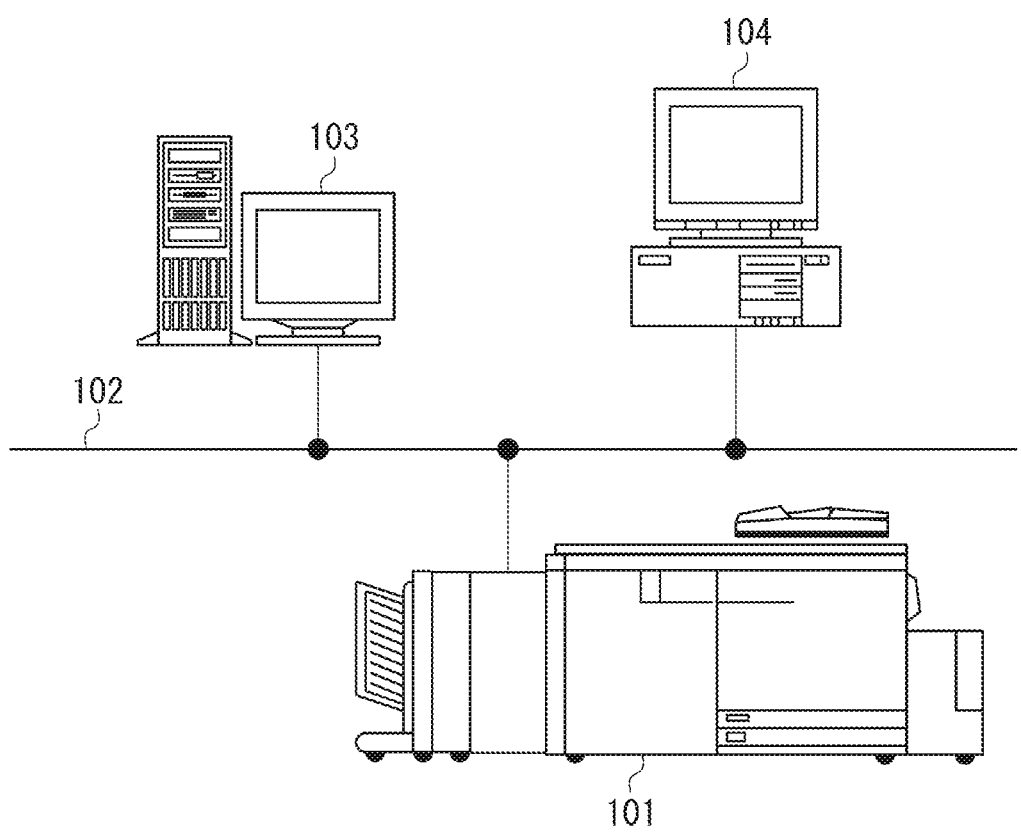
FIG. 1 illustrates a configuration of an information processing system.

FIG. 1 illustrates an example of an information processing system to which a control apparatus according to a first exemplary embodiment is applied. According to the present exemplary embodiment, the information processing system includes an image forming apparatus 101 having the control apparatus and another control apparatus which are connected with each other via a network so as to be able to communicate with each other.

Referring to FIG. 1, the image forming apparatus 101 processes various types of input data, and performs image printing on printing paper. The image forming apparatus 101 is connected with a print server 103 and a client personal computer (PC) 104 via a network 102.

Figure 2:
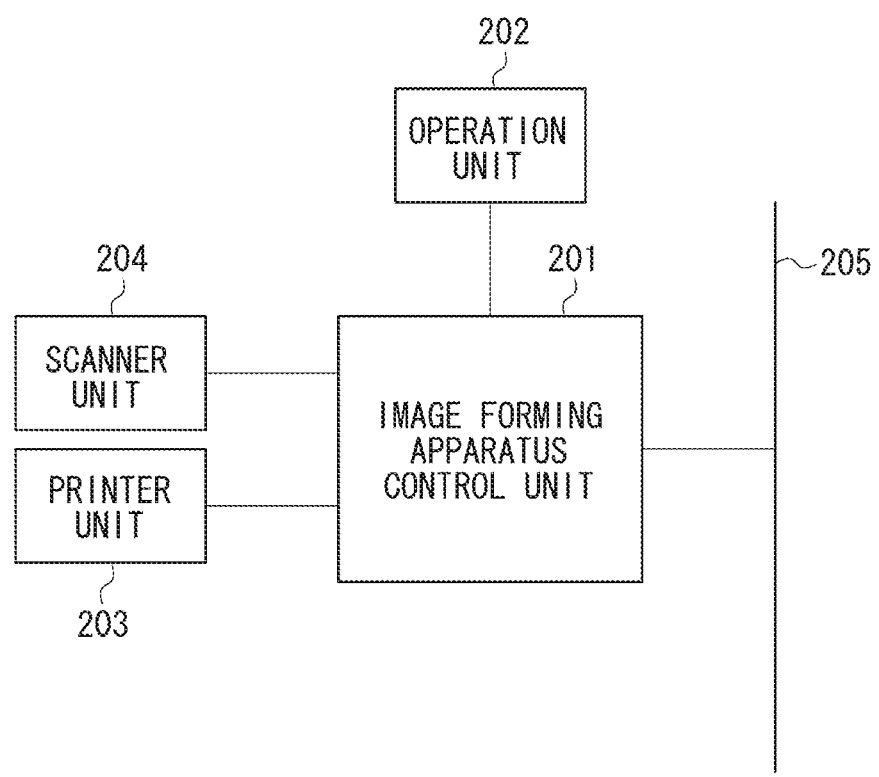
FIG. 2 is a block diagram illustrating an internal configuration of an image forming apparatus illustrated in FIG. 1.

FIG. 2 is a block diagram illustrating an internal configuration of the image forming apparatus 101 illustrated in FIG. 1.

Referring to FIG. 2, an image forming apparatus control unit 201 controls each unit in the image forming apparatus 101. An operation panel 202 is used by a user to perform various operations, and includes a liquid crystal display (LCD) display device for displaying operation information. The LCD display device may be provided with a touch panel function.

A printer unit 203 prints and outputs various kinds of input images processed in the image forming apparatus control unit 201. A scanner unit 204 scans an image and inputs the image to the image forming apparatus control unit 201. According to the present exemplary embodiment, a network 205 is a local area network (LAN). The LAN 205 corresponds to the network 102 illustrated in FIG. 1. The LAN 205 is connected with the print server 103 and the client PC 104, and performs LAN communication.

Figure 3:
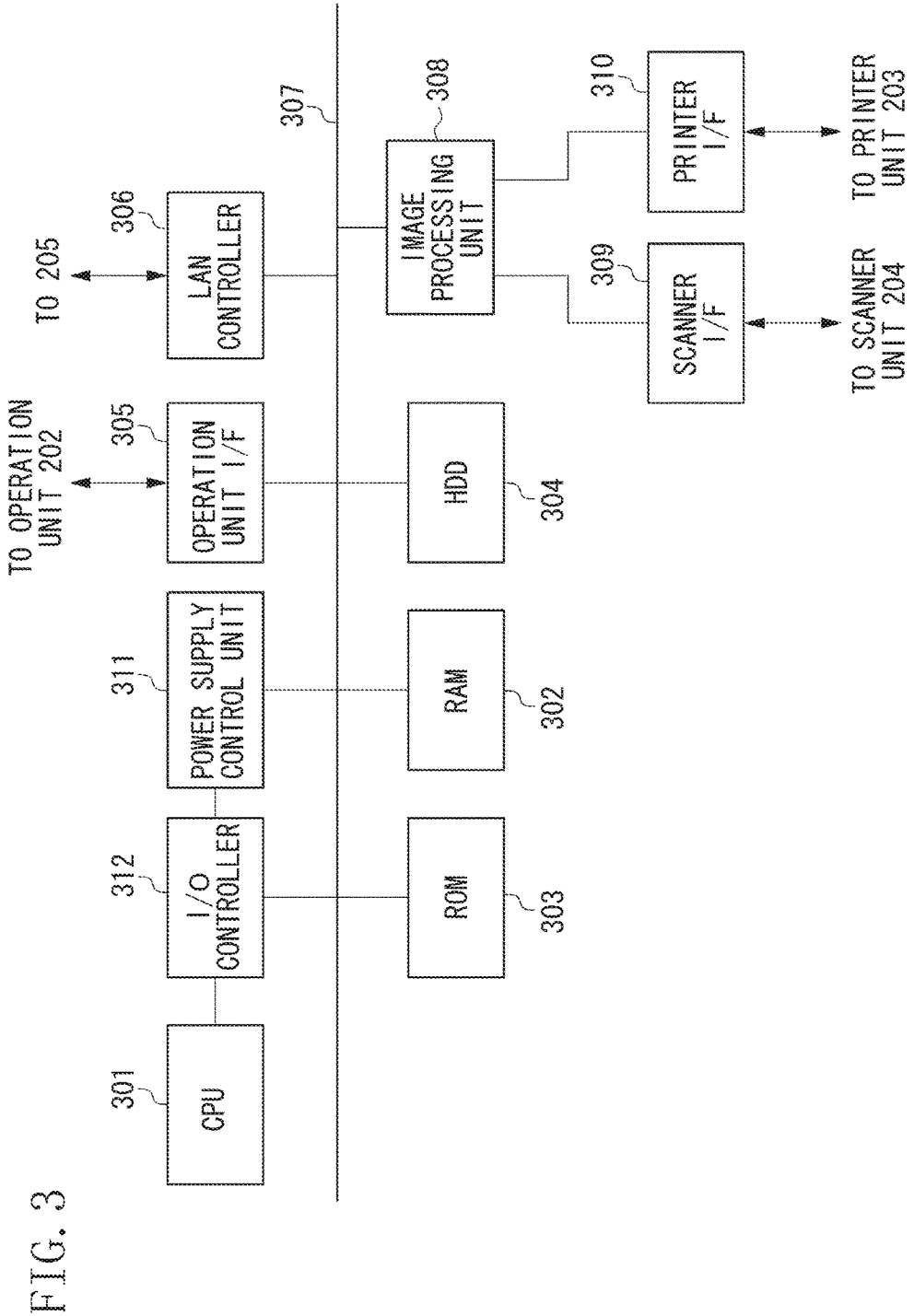
FIG. 3 is a block diagram illustrating a detailed internal configuration of a control unit.

FIG. 3 is a block diagram illustrating a detailed internal configuration of the image forming apparatus control unit 201 illustrated in FIG. 2. According to the exemplary embodiment, a CPU 301 as a first control unit, and an input/output (I/O) controller 312 having a memory, the memory being described below, as a second control unit are provided. In response to power supply, the I/O controller 312 performs start processing stored in the memory described below.

Referring to FIG. 3, the CPU 301 controls access to currently connected various devices based on a control program and the like stored in a ROM 303 via the I/O controller 312. According to the present exemplary embodiment, in terms of the control from the CPU 301, most of the control is performed via the I/O controller 312 in actual control.

A random access memory (RAM) 302 is a system work memory for the CPU 301 to operate. The RAM 302 also serves as an image memory for temporarily store data via an image processing unit 308. A hard disk drive (HDD) 304 can store system software and image data.

An operation unit I/F 305 is an interface unit for connecting a system bus 307 and the operation unit 202. The operation unit I/F 305 receives image data to be displayed on the operation unit 202 from the system bus 307, and outputs the image data to the operation unit 202, or outputs information input from the operation unit 202 to the system bus 307.

A LAN controller 306 is connected to the LAN 205 and the system bus 307. The LAN controller 306 performs input/output control of information to be exchanged with an external device connected via the LAN 205. An image processing unit 308 performs image processing. The image processing unit 308 can read image data stored in the RAM 302, and perform image edit processing, such as enlargement and reduction, and color adjustment.

The image-processed image data is output to the printer unit 203 via a printer I/F 310. A scanner I/F 309 is provided, and the image processing unit 308 performs desired image processing on image data scanned by the scanner unit 204. The processed data is transferred to a unit according to operation settings, for example, to the printer I/F 310 for copying, and to the HDD 304 for storage.

A power supply control unit 311 performs power supply control of the components in the image forming apparatus control unit 201, the printer unit 203, and the scanner unit 204.

Figure 4:
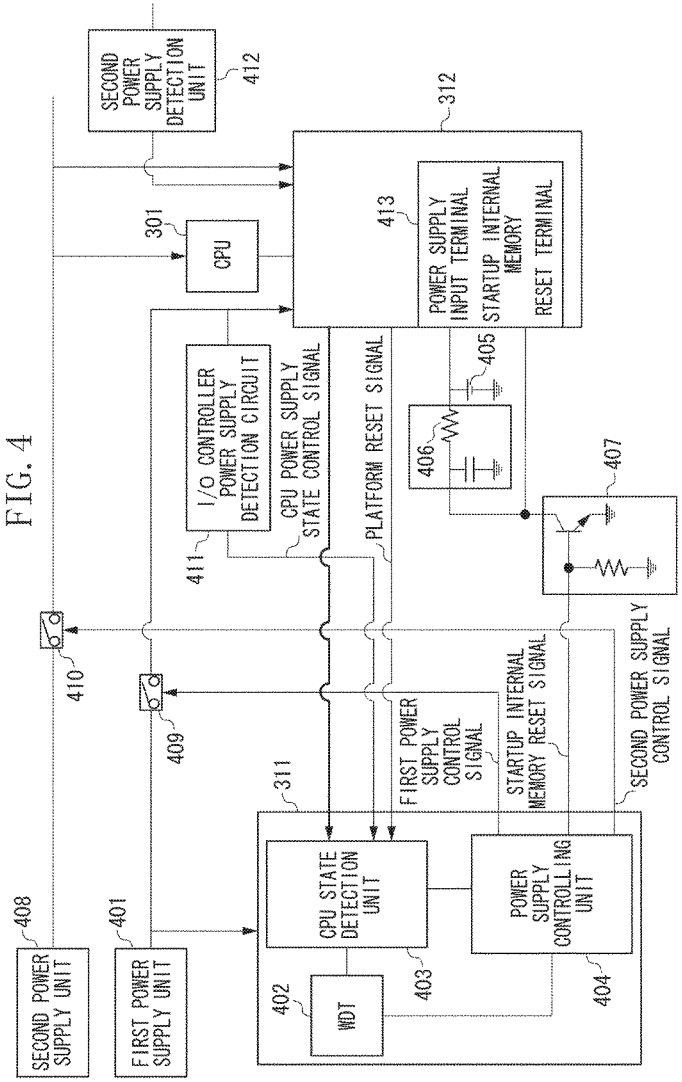
FIG. 4 is a block diagram illustrating a configuration for power supply control of a control apparatus.

FIG. 4 is a block diagram illustrating a configuration for power supply control of the control apparatus according to the present exemplary embodiment. Reset control of a startup internal memory in the second control unit (the I/O controller 312) will be described below.

Referring to FIG. 4, a startup internal memory 413 is provided in the I/O controller 312. In terms of the configuration of the IC, the CPU 301 and the I/O controller 312 may be configured as the same IC.

The power supply control unit 311 illustrated in FIG. 4 is the one which is illustrated in FIG. 3 includes a watchdog timer (WDT) 402, a CPU state detection unit 403, and a power supply controlling unit 404. A first power supply unit 401 provides first power supply to the power supply control unit 311.

A coin battery 405 serves as a backup power source. The coin battery 405 supplies electric power to the startup internal memory 413. The coin battery 405 supplies electric power to a power supply input terminal of the startup internal memory 413, and inputs a timing signal that has been timing-adjusted by a resistance-capacitance (RC) delay circuit 406 to a reset terminal of the startup internal memory 413. This timing signal is normally held in an H level while the coin battery 405 is provided.

An inverter circuit 407 reverses a startup internal memory reset signal output from the power supply controlling unit 404. The power supply controlling unit 404 outputs an L level of the startup internal memory reset signal under a normal state. In a case where the power supply control unit 311 detects an abnormal state in the startup internal memory 413, the power supply controlling unit 404 outputs the H level of the startup internal memory reset signal, and when the signal reversed in the inverter circuit 407 is input to the reset terminal of the startup internal memory 413 in the L level, initialization of the startup internal memory 413 is performed.

Under a normal state, when electric power is supplied from the first power supply unit 401 to the power supply control unit 311, the power supply control unit 311 controls a first power supply control signal to turn on a power switch 409. When the power switch 409 is turned on, electric power is supplied to the I/O controller 312 from the first power supply unit 401. Then, an I/O controller power supply detection circuit 411 detects a power supply level, and transfers the detection result to the CPU state detection unit 403. The I/O controller power supply detection circuit 411 also sends a CPU power supply state signal to the CPU state detection unit 403. The CPU state detection unit 403 detects both of the signals, and sends notification of a state of the power supplied to the CPU 301 and a state of the power supplied to the I/O controller 312, and a CPU power supply state control signal of the result to the power supply controlling unit 404.

With such a configuration, the power supply controlling unit 404, when the notification result is normal, controls a second power supply control signal to turn on a power switch 410. Then, second power supply is provided to the CPU 301 and the I/O controller 312. A plurality of first power supplies and second power supplies may be provided.

Then, in a case where an input from a second power supply detection unit 412 that detects that all devices to which the second power is supplied are in a normal state indicates a normal state, the I/O controller 312 sets a platform reset signal to a deassert state (H level), and sends the signal to the CPU state detection unit 403.

FIG. 5 is a diagram illustrating a power supply state of the control apparatus according to the present exemplary embodiment. The example illustrated in FIG. 5 shows a relationship in CPU power supply states according to changes in the CPU power supply state control signal illustrated in FIG. 4.

According to the present exemplary embodiment, a CPU power supply state is indicated by two control signals of a CPU power supply state signal 1 and a CPU power supply state signal 2.

In a case where the power supply from the first power supply unit 401 is in a normal state, the I/O controller 312 controls the CPU power supply state control signal and sends the CPU power supply state control signal to the CPU state detection unit 403 to shift the operation status to the next operation status. Under a normal state, when the power switch 409 is turned on, in order to once start the image forming apparatus 101 in the operation state, the CPU power supply state signal 1 and the CPU power supply state signal 2 are sequentially changed from the L level to the H level, and the image forming apparatus 101 starts in the operation state.

After a predetermined time period is passed, and the time reaches a sleep setting time set to the control apparatus, the CPU 301 performs a desired memory saving operation. Then, the CPU power supply state signal 2 is changed from the H level to the L level, and the image forming apparatus 101 shifts to the sleep state.

According to the present exemplary embodiment, when a user turns on a switch (not illustrated) of the image forming apparatus 101 from a power off state, the image forming apparatus 101 shifts to the operation state and starts. Consequently, a soft off state (after supply of electric power, the image forming apparatus 101 is in a stop state at the level of software) is not supported.

However, in the startup internal memory 413, if the portion for specifying the power supply state at the time of start is rewritten, and a setting for the soft off startup is unintentionally enabled, the image forming apparatus 101 looks as if not started.

Figure 6:
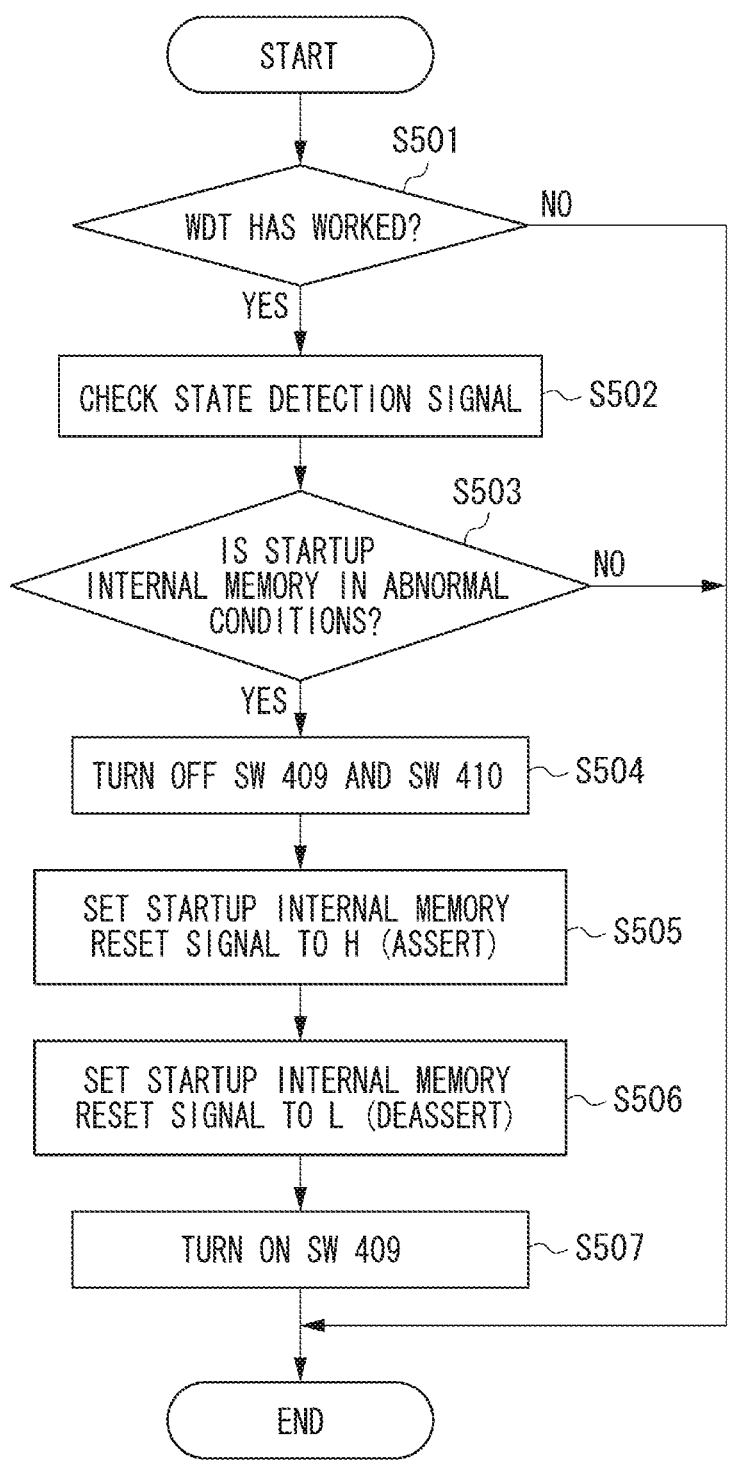
FIG. 6 is a flowchart illustrating a control method of the control apparatus.

FIG. 6 is a flowchart illustrating a method for controlling the control apparatus according to the present exemplary embodiment. According to the present exemplary embodiment, an example of the control of the power supply control unit 311 of when the CPU state detection unit 403 detects an abnormal state of the startup internal memory 413 and initialization of the startup internal memory 413 is performed is described.

In step S501, in a case where the CPU state detection unit 403 determines that the watchdog timer 402 has worked (YES in step S501), the processing proceeds to step S502. Examples of the factors for the watchdog timer 402 to work include, first, a case where a predetermined time period has passed since the power switch 409 was turned on by the power supply controlling unit 404 with the first power supply control signal, but the I/O controller power supply detection circuit 411 does not become in a normal state. Second, the examples include a case where, similarly, a predetermined time period has passed since the power switch 409 was turned on, and even though the I/O controller power supply detection circuit 411 is in a normal state, the CPU power supply state control signals 1 and 2 become in the soft off state as illustrated in FIG. 5.

In step S502, the CPU state detection unit 403 checks the I/O controller power supply detection circuit 411 as the CPU state detection signal, the CPU power supply state control signal, and a platform reset signal output from the I/O controller 312, and the processing proceeds to step S503. For example, in the case of the first example in which the watchdog timer 402 works, the power supply to the I/O controller 312 itself is not in a normal state. Consequently, the CPU state detection unit 403 determines that the startup internal memory 413 is not in an abnormal state, and skips the startup internal memory 413 abnormal processing, and the processing proceeds to a process for system restart.

On the other hand, in the case of the second example in which the watchdog timer 402 works, there is a possibility that the initial setting of the startup internal memory 413 is in some abnormal state. Then, the processing proceeds to S504. In step S504, to comply with the power supply sequence of the I/O controller 312, the power supply controlling unit 404 sequentially turns off the power switches 409 and 410 to stop the power supply to once turn off the power supply other than the power supply to the startup internal memory 413.

In step S505, the power supply controlling unit 404 sets the startup internal memory reset signal generated by own to the H level to assert the reset terminal of the startup internal memory 413. After a time period sufficient for the reset has passed, in step S506, the power supply controlling unit 404 resets the startup internal memory reset signal to the L level, and deasserts the reset signal to the startup internal memory 413. In step S506, the power supply controlling unit 404 turns on the power switch 409, and performs the system restart.

Figure 7A:
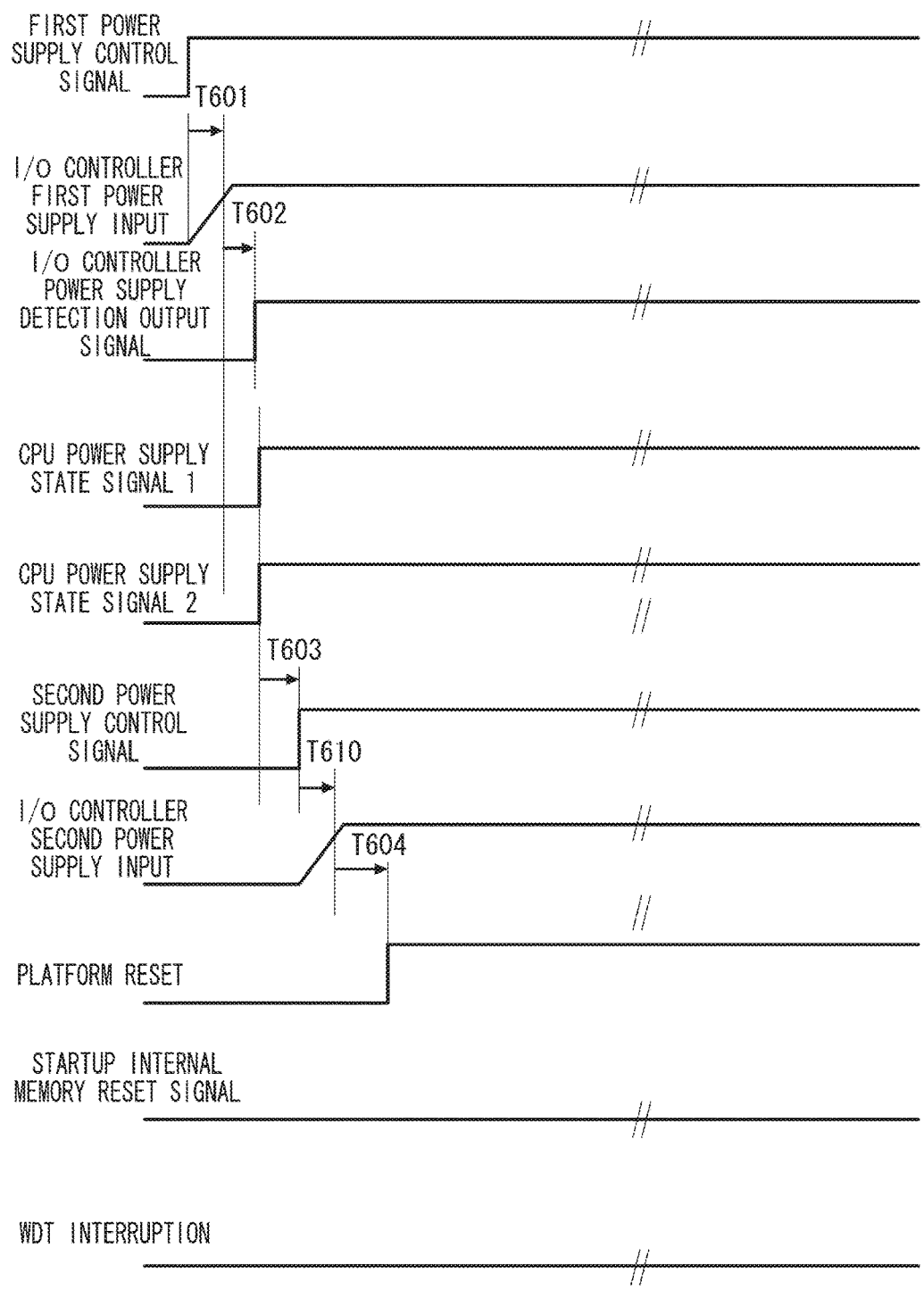
Figure 7B:
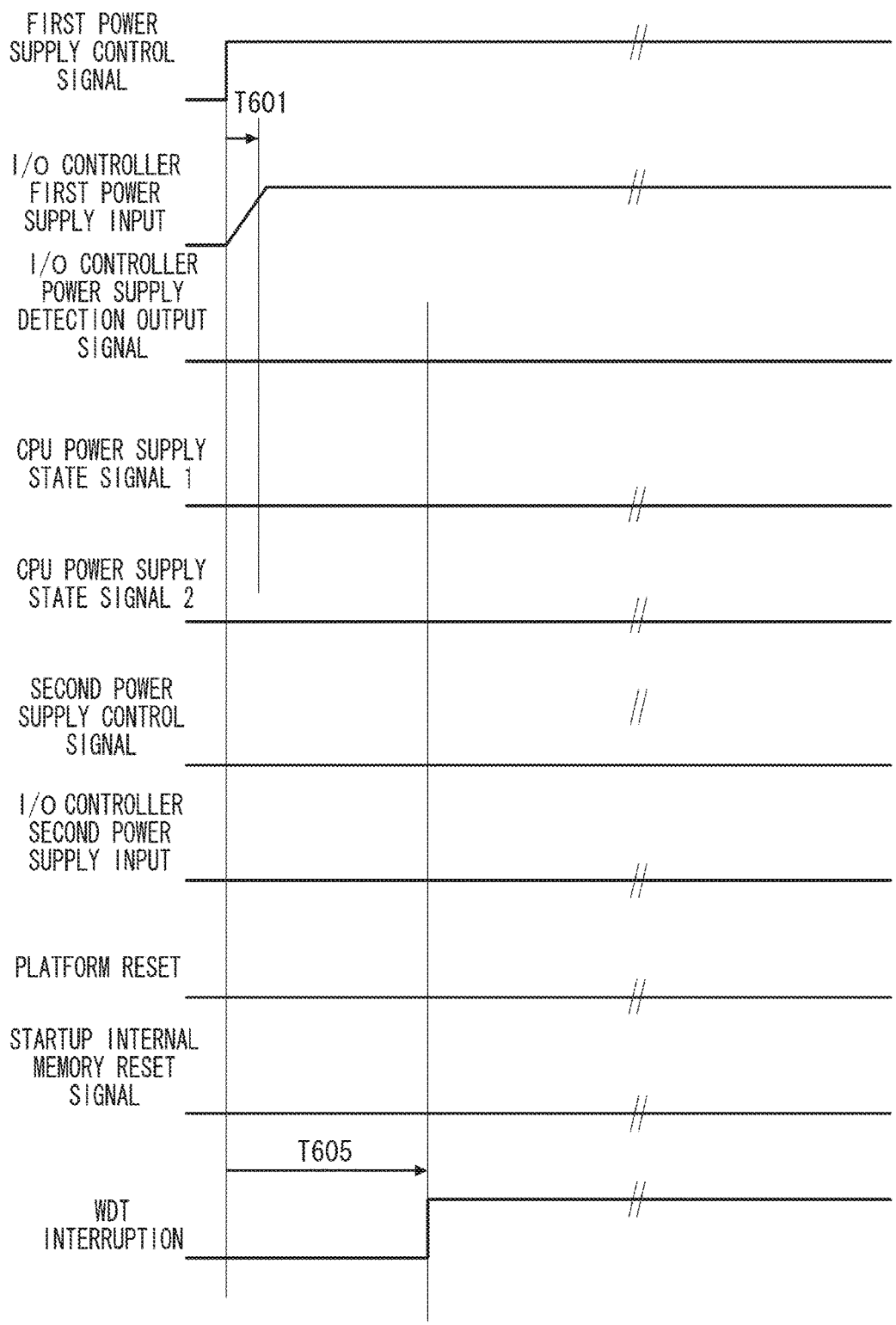

FIGS. 7A to 7C are timing charts each illustrating a power supply start state of the control apparatus illustrated in FIG. 4.

FIG. 7A is a timing chart in a normal start. First, electric power is supplied from the first power supply unit to the power supply control unit 311. Then, the power supply controlling unit 404 controls the first power supply control signal to turn on the power switch 409. Detection for where voltage of the I/O controller power supply detection circuit 411 reaches a desired voltage in delay time T601 is performed using an I/O controller first power supply input, and after delay time T602 has passed, an I/O controller power supply detection output signal is set to the H level.

After a predetermined time period is passed since an input from the first power supply unit 401 to the I/O controller 312 has been performed, control is performed for the I/O controller 312 in such a manner that the CPU power supply state signal 1 and the CPU power supply state signal are sequentially set to the H level. The CPU state detection unit 403 sends, to the power supply controlling unit 404, notification that both of an I/O controller power supply detection output signal and the CPU power supply state signal 2 have been set to the H level. After delay time T603 has passed, the power supply controlling unit 404 determines that the CPU 301 is in a normal state, and controls the second power supply control signal to turn on the power switch 410. With such an operation, after the second power supply is provided to the I/O controller 312, and the delay time T610 is passed, the power supply input reaches the desired voltage. Then, delay time T604 has passed since the power supply input reaches the desired voltage, the I/O controller 312 releases the platform reset. In this operation, a startup internal memory reset signal is held in the L level.

FIG. 7B is a timing chart illustrating a case where there is an abnormal state at starting (the above-described first example in the description of FIG. 6).

Similar processing in which after electric power is supplied from the first power supply unit 401 to the power supply control unit 311, the power supply controlling unit 404 controls the first power supply control signal to turn on the power switch 409 is to be performed.

After the processing, in a case where there is no response from the CPU 301 while the watchdog timer 402 waits for a period of delay time T605, the watchdog timer 402 performs interruption. Then, the CPU state detection unit 403 detects states of both of the I/O controller power supply detection output signal and the CPU power supply state signal 2, and sends notification to the power supply controlling unit 404.

Since the I/O controller power supply detection output signal is held in the L level, the power supply controlling unit 404 determines that the startup internal memory 413 is not abnormal. Then, the startup internal memory 413 abnormal processing is skipped, and the processing proceeds to a process for system restart.

FIG. 7C is a timing chart illustrating a case where there is an abnormal condition at starting (the above-described second example in the description of FIG. 6).

Similar processing in which after electric power is supplied from the second power supply unit 408 to the power supply control unit 311, the power supply controlling unit 404 controls the first power supply control signal to turn on the power switch 409 is to be performed.

After the processing, in a case where there is no response from the CPU 301 while the watchdog timer 402 waits for the period of delay time T605, the watchdog timer 402 performs interruption. Then, the CPU state detection unit 403 detects states of both of the I/O controller power supply detection output signal and the CPU power supply state signal 2, and sends notification to the power supply controlling unit 404.

Since the I/O controller power supply detection output signal is in the H level, and the CPU power supply state signal indicates the soft off state, the power supply controlling unit 404 determines that there is a possibility that the startup internal memory is in an abnormal state, and performs processing for a startup internal memory abnormal state.

After delay time T606 since the watchdog timer 402 performs the interruption, the power supply controlling unit 404 controls the first power supply control signal to turn off the power switch 409. Then, after delay time T607 in which an I/O controller power supply voltage is sufficiently dropped, the power supply controlling unit 404 sets the startup internal memory reset signal to the H level, and resets the startup internal memory 413.

After delay time T608 in which the reset processing is sufficiently performed, the power supply controlling unit 404 resets the startup internal memory reset signal to the L level. Then, after delay time T609, the power supply controlling unit 404 controls the first power supply control signal to turn on the power switch 409, and performs the system restart.

As described above, according to the present exemplary embodiment, the state of the input power supply of the CPU 301 (including the I/O controller 312) and the state of the CPU power supply state signal are detected to avoid the case where the system does not start in a state where there is a possibility that the startup internal memory 413 is in an abnormal state.

Further, to ensure the power supply sequence, the power supply control of the peripheral circuits of the startup internal memory 413 is performed. This enables the startup internal memory 413 to be surely initialized without losing the reliability of the IC.

According to the above-described first exemplary embodiment, the control for initializing the startup internal memory 413 to be performed when the startup internal memory 413 is in an abnormal state has been described.

In a second exemplary embodiment, an example of a system having a unit for correcting initialization of time information stored in the startup internal memory 413 at initialization of the startup internal memory 413 is described. A system configuration, and a schematic configuration in the image forming apparatus 101 are similar to those in the first exemplary embodiment, and their descriptions are omitted.

Figure 8:
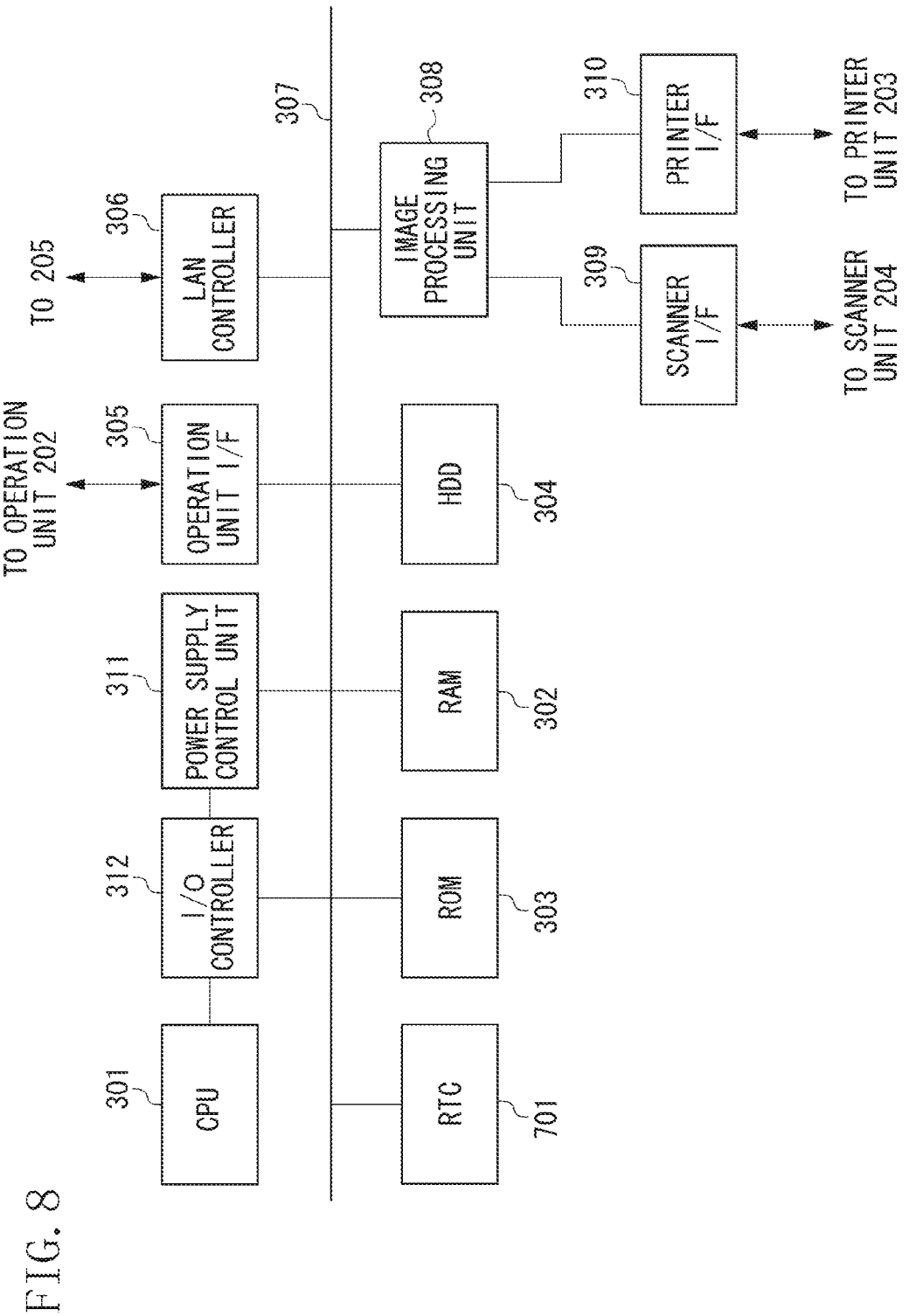
FIG. 8 is a block diagram illustrating a configuration of the control apparatus.

FIG. 8 is a block diagram illustrating a configuration of a control apparatus according to the present exemplary embodiment. According to the present exemplary embodiment, with respect to the configuration illustrated in FIG. 3, specifically, a configuration having an RTC unit 701 separately provided from the RTC unit in the I/O controller 312, the RTC unit 701 being connected to the system bus 307, is provided. The other configurations are similar to those in the first exemplary embodiment, and their descriptions are omitted.

FIG. 9 is a block diagram illustrating a configuration for power supply control of the control apparatus illustrated in FIG. 8. This example corresponds to a detailed configuration relating to initialization control of the startup internal memory 413. To components similar to those in FIG. 4, the same reference numerals are applied, and their descriptions are omitted.

In the configuration illustrated in FIG. 9, the external RTC 701 is connected to a power supply provided with the coin battery 405 with respect to an internal RTC (not illustrated) of the I/O controller 312. The external RTC 701 is not initialized at the time of power-on, and is not reset by the startup internal memory reset signal. Consequently, when the startup internal memory 413 is initialized, at the time of restart, time information of the external RTC 701 is referred, and the time information of the startup internal memory 413 is rewritten. This enables the system to update an incorrect time caused by the initialization to a correct time.

According to the first exemplary embodiment, the control of initializing the startup internal memory 413 when the startup internal memory 413 is in an abnormal condition has been described.

According to a third exemplary embodiment, when the startup internal memory 413 is initialized, the time information stored in the startup internal memory 413 is initialized. Therefore, notification for the user indicating that the time information has been initialized is provided on the operation unit 202, and the user can be prompted to rewrite the time information.

FIG. 10 is a diagram illustrating an example of a UI screen to be displayed on the operation panel 202 illustrated in FIG. 2.

According to the present exemplary embodiment, even if the apparatus time is initialized at the time of the initialization of the startup internal memory 413, the message for notifying the user that the time has been initialized can be provided on the operation unit 202, and the user can be prompted to reset the time.

Each process in the exemplary embodiments of the present invention can be implemented by executing software (program) acquired via a network or various storage media using a processing device (CPU or processor) such as a personal computer (computer).

According to the exemplary embodiments of the present invention, in response to detection of an abnormal state in a content of a memory for performing power supply start processing, a controller is normally started by resetting the memory.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-022028 filed Feb. 7, 2014, which is hereby incorporated by reference herein in its entirety.

What is claimed is:

1. A control apparatus comprising:
   a memory which stores at least information indicating a condition to start a boot processing of the control apparatus;
   a first controller which performs the boot processing of the control apparatus, wherein the first controller refers to the information stored in the memory in response to receiving power, and then the first controller, in a case where the information stored in the memory is first information, starts the boot processing without waiting for an input of a certain signal, and, in a case where the information stored in the memory is second information, waits for the input of the certain signal and starts the boot processing in response to the input of the certain signal; and
   a second controller which initializes the information stored in the memory on a basis of lapse of a predetermined time without performing the boot processing after supplying power to the first controller.

2. The control apparatus according to claim 1, wherein the second controller outputs a reset signal for initializing the information stored in the memory.

3. The control apparatus according to claim 2, further comprising a display which displays a screen for correcting time information stored in the memory.

4. The control apparatus according to claim 1, further comprising a display which displays a message indicating that initialization of the information stored in the memory has been performed.

5. The control apparatus according to claim 1, further comprising a first power supply unit which supplies electric power to the first controller and the second controller.

6. The control apparatus according to claim 1, further comprising a battery which supplies electric power to the memory.

7. The control apparatus according to claim 6, wherein the battery is a coin battery.

8. The control apparatus according to claim 1, wherein, based on information indicating a status of the first controller transmitted from the first controller, the second controller determines whether the first controller performs the boot processing or not, and initializes the information stored in the memory on the basis of a determination that the first controller does not perform the boot processing and lapse of the predetermined time.

9. The control apparatus according to claim 1, the second controller includes a timer for issuing an interrupt signal when an access from the first controller is not input for a predetermined time period and a signal output circuit for outputting a reset signal to initialize the information stored in the memory in accordance with receiving the interrupt signal from the timer.

10. The control apparatus according to claim 1, wherein, in a case where a first signal indicating that the first controller receives power is input to the second controller and a second signal indicating a status of the first controller has changed is not input to the second controller, the second controller initializes the information stored in the memory.

11. The control apparatus according to claim 1, the information stored in the memory is initialized by causing a jumper pin mounted on a motherboard to be short-circuited.

12. The control apparatus according to claim 1, further comprising a printer which prints an image on a sheet.

13. A control method of a control apparatus having a first controller, a second controller, and a memory which stores at least information indicating a condition to start a boot processing of the control apparatus, the method comprising:
   referring, by the first controller, to the information stored in the memory in response to receiving power;
   performing, by the first controller, the boot processing of the control apparatus, wherein performing the boot processing includes:
      starting, in a case where the information stored in the memory is first information, the boot processing without waiting for an input of a certain signal, and, in a case where the information stored in the memory is second information, waiting for the input of the certain signal and starting the boot processing in response to the input of the certain signal; and
   initializing, by the second controller, the information stored in the memory on a basis of lapse of a predetermined time without performing the boot processing after supplying power to the first controller.

14. A control apparatus comprising:
   a memory which stores information;
   a coin battery which supplies power to the memory;
   a first controller which performs a boot processing of the control apparatus, wherein the first controller refers to the information stored in the memory in response to receiving power, and then performs a boot processing of the control apparatus; and
   a second controller which initializes the information stored in the memory on a basis of lapse of a predetermined time without performing the boot processing of the control apparatus after supplying power to the first controller.

15. The control apparatus according to claim 14, wherein the second controller outputs a reset signal for initializing the information stored in the memory.

16. The control apparatus according to claim 14, wherein, based on information indicating a status of the first controller transmitted from the first controller, the second controller determines whether the first controller performs the boot processing or not, and initializes the information stored in the memory on the basis of a determination that the first controller does not perform the boot processing and lapse of the predetermined time.

17. The control apparatus according to claim 14, the second controller includes a timer for issuing an interrupt signal when an access from the first controller is not input for a predetermined time period and a signal output circuit for outputting a reset signal to initialize the information stored in the memory in accordance with receiving the interrupt signal from the timer.

18. The control apparatus according to claim 14, wherein, in a case where a first signal indicating that the first controller receives power is input to the second controller and a second signal indicating a status of the first controller has changed is not input to the second controller, the second controller initializes the information stored in the memory.

19. The control apparatus according to claim 14, the information stored in the memory is initialized by causing a jumper pin mounted on a motherboard to be short-circuited.

20. The control apparatus according to claim 14, further comprising a printer which prints an image on a sheet.

* * * * *